US009768885B2

United States Patent
Qi (10) Patent No.: US 9,768,885 B2
(45) Date of Patent: Sep. 19, 2017

(54) PILOT-AIDED FEEDFORWARD DATA RECOVERY IN OPTICAL COHERENT COMMUNICATIONS

(71) Applicant: UT-Battelle, LLC, Oak Ridge, TN (US)

(72) Inventor: Bing Qi, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 7 days.

(21) Appl. No.: 14/849,675

(22) Filed: Sep. 10, 2015

(65) Prior Publication Data

US 2017/0078029 A1    Mar. 16, 2017

(51) Int. Cl.
| | |
|---|---|
| H04B 10/61 | (2013.01) |
| H04L 7/00 | (2006.01) |
| H04B 10/079 | (2013.01) |
| H04B 10/63 | (2013.01) |
| H04B 10/64 | (2013.01) |

(52) U.S. Cl.
CPC ..... *H04B 10/6165* (2013.01); *H04B 10/0795* (2013.01); *H04B 10/63* (2013.01); *H04B 10/64* (2013.01); *H04L 7/0008* (2013.01); *H04L 7/0075* (2013.01)

(58) Field of Classification Search
None
See application file for complete search history.

(56) References Cited

U.S. PATENT DOCUMENTS

| | | | | |
|---|---|---|---|---|
| 5,115,332 A | * | 5/1992 | Naito | ........... H04B 10/2513 398/202 |
| 2010/0142971 A1 | * | 6/2010 | Chang | ........... H04B 10/61 398/154 |

OTHER PUBLICATIONS

Ip, E., et al., "Feedforward Carrier Recovery for Coherent Optical Communications", Journal of Lightwave Technology, vol. 25., No. 9, Sep. 2007, pp. 2675-2691.
Park, H., et al., "40Gbit/s coherent optical receiver using a Costas loop", Optics Express, vol. 20, No. 26, Dec. 2012, pp. B197-B203.
Fice, M.J., et al., "Homodyne coherent optical receiver using an optical injection phase-lock loop", Journal of Lightwave Technology, vol. 29, No. 8, Feb. 2011, pp. 1152-1164.

* cited by examiner

*Primary Examiner* — Darren E Wolf
(74) *Attorney, Agent, or Firm* — Warner Norcross & Judd LLP (57) ABSTRACT

A method and a system for pilot-aided feedforward data recovery are provided. The method and system include a receiver including a strong local oscillator operating in a free running mode independent of a signal light source. The phase relation between the signal light source and the local oscillator source is determined based on quadrature measurements on pilot pulses from the signal light source. Using the above phase relation, information encoded in an incoming signal can be recovered, optionally for use in communication with classical coherent communication protocols and quantum communication protocols.

20 Claims, 5 Drawing Sheets

PILOT-AIDED FEEDFORWARD DATA RECOVERY IN OPTICAL COHERENT COMMUNICATIONS

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to optical coherent communications, and in particular, feedforward data recovery for optical coherent communications.

Recent years have witnessed the emergence of commercial quantum communication systems and field test beds. Despite tremendous potential, however, the high costs associated with quantum communications have limited its application. Mainstream protocols, such as the BB84 protocol, are implemented with expensive, inefficient single photon detectors. These protocols require dedicated dark fibers for transmitting quantum signals because they cannot tolerate crosstalk from classical communication channels.

One proposed solution is the continuous-variable (CV) quantum encryption protocol, which is based on coherent detection. In coherent detection, a local oscillator (LO) is used to beat with the signal to be measured. The detection sensitivity can be greatly enhanced by increasing the power of the LO. In the meantime, only photons in the same spatiotemporal and polarization mode as the LO can be detected while noise photons in different modes will be suppressed effectively. Thus, the LO acts as a "mode selector" and can filter out most of the background noise. The "mode selection" function is important in protocols where the extremely weak quantum signal can be overwhelmed by background noise.

Coherent detection also relies on the fixed phase relation between the transmitter laser and the local oscillator laser. However, due to the lack of an effective way to precisely synchronize the frequency and phase of the transmitter laser with the local oscillator laser, phase noise is a major impairment in coherent optical communication. While various techniques, such as feedforward carrier recovery, optical phase-locked loops, and optical injection phase-locked loops, have been developed in classical coherent communications, these techniques are not applicable in quantum coherent communication protocols where the quantum signal is extremely weak and the tolerable noise (including phase noise) must be significantly below the shot noise limit. The current solution in quantum coherent communications is to generate both the quantum signal and the LO from the same laser and transmit both of them through the same communications channel. However, this arrangement can create serious security problems. In addition, this arrangement can reduce communication efficiency and multiplexing capacity since the strong LO (typically 7 or 8 orders brighter than the quantum signal) can generate both in-band and out-of-band noise photons when it propagates through the communications channel.

Accordingly, there remains a continued need for an improved phase recovery scheme for coherent optical communications. In particular, there remains a continued need for an improved phase recovery scheme which provides shot noise limited coherent detection without locking the phase of the transmitter laser to that of the LO laser, while also reducing infrastructure costs for quantum communications and potentially providing a vehicle for classical communications.

SUMMARY OF THE INVENTION

A method and a system for pilot-aided feedforward data recovery are provided. The method includes operating a light source for local oscillator generation ("LO source") in a free running mode independent of a light source for signal generation ("signal source") and determining the phase drift between the signal source and the LO source based on quadrature measurements of pilot pulses. Using the determined phase drift, information encoded in an incoming signal can be recovered, optionally for use in classical coherent communication protocols and quantum communication protocols.

In one embodiment, the method includes transmitting a signal pulse and a reference pulse from the signal source, measuring the quadrature values of the signal pulse and the reference pulse at the receiver using the local oscillator, determining the phase difference between the signal source and the LO source based on the quadrature measurements of the reference pulse, and recovering encoded information from the quadrature measurements of the signal pulse and the determined phase difference between the signal source and the LO source. The signal pulse can be modulated to encode quantum or classical information, and the reference pulse serves as a phase reference. The receiver measures the in-phase quadrature and the out-of-phase quadrature of the signal pulse and the reference pulse with an optical quadrature hybrid in a randomly rotated basis due to the phase shift between the signal source and the LO source.

In another embodiment, the system includes an optical receiver for coherent light detection. The optical receiver includes an input, a LO source, an optical quadrature hybrid, and a signal processor. The input receives an optical signal from a signal source, for example a laser, the optical signal including a signal pulse and a reference pulse separated by a time delay. The LO source provides first and second local oscillators (LO) separated by the same time delay. The optical quadrature hybrid measures the quadratures (in-phase and out-of-phase) of the signal pulse using the first LO and measures the quadratures (in-phase and out-of-phase) of the reference pulse using the second LO. The signal processor determines the phase difference between the signal source and the LO source based, in part, on the measured quadratures of the reference pulse. The signal processor then recovers information encoded or embodied in the signal pulse based on this phase difference. The signal process optionally outputs the information for use in classical coherent communication protocols and quantum communication protocols.

In quantum communication protocols, the signal pulse is typically very weak (e.g., less than 10 photons per pulse). To obtain a precise estimation of phase, a brighter reference pulse can be employed (e.g., 1000 photons per pulse). In this case, the intensity of the local oscillator for measuring the reference pulse can be scaled down to avoid saturation of the coherent receiver. The reference pulse is used to estimate the phase difference between the signal source and the local oscillator source. The reference pulse is not used as a local oscillator in coherent detection, and therefore does not create security loopholes in quantum communication. In addition, the intensity of the reference pulse (on the order of $10^3$ photons) is much lower than the intensity of the local oscillator (on the order of $10^8$ photons). The noise photons generated by the reference pulse in the optical communications channel is practically negligible.

The method and system of the present invention removes many of the challenges in previous approaches to quantum coherent communication and can also be used in classical coherent communication. For example, the method and system of the present invention can allow multiple quantum communication channels to share the same optical fiber with classical communication channels using standard dense wavelength division multiplexing technology. By adjusting the intensity of the signals, the same system can work in either a quantum regime to implement quantum communication protocols or in a classical coherent communication system.

These and other features and advantages of the present invention will become apparent from the following description of the invention, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

The current embodiments relate to a method and a system for pilot-aided feedforward data recovery in optical data communications, including both classical coherent communication protocols and quantum coherent communication protocols. As set forth below, the method and system include pilot pulses to determine the phase relation between a signal source and a local oscillator source and, using the phase relation, recover information encoded in the input signal.

Figure 1:
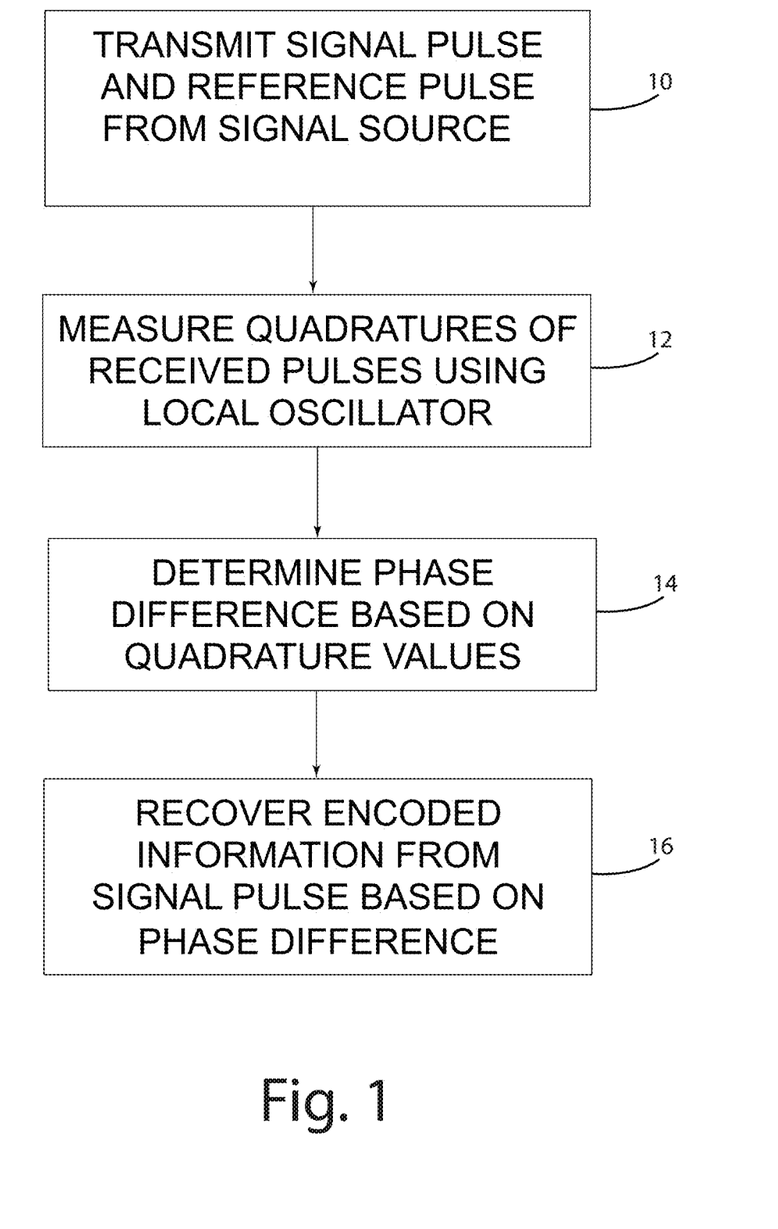
FIG. 1 is a flow diagram of pilot-aided feedforward data recovery in accordance with a current embodiment.

Referring now to FIG. 1, a flow chart illustrating a method for pilot-aided feedforward data recovery in accordance with one embodiment is presented. In general terms, the method can include the following steps: (a) transmitting a signal pulse and a reference pulse from a signal source; (b) measuring the quadrature values of the signal pulse and the reference pulse at the receiver using a local oscillator source; (c) determining the phase difference between the coherent light source and the local oscillator source based on the quadrature measurements of the reference pulse; (d) and recovering encoded information from the signal pulse based on the quadrature measurements of the signal pulse and the determined phase difference between the signal source and the local oscillator source. Each step is discussed below.

Figure 2A:
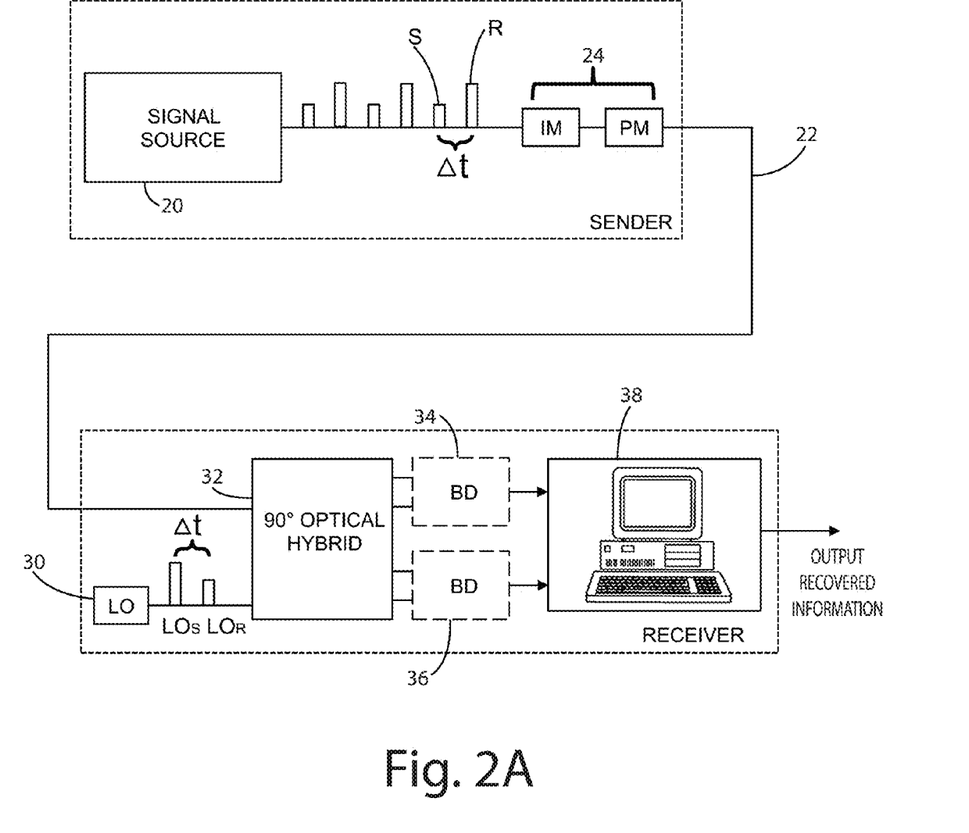
FIG. 2(A) is a pilot-aided feedforward data recovery system in accordance with a current embodiment.
Figure 2B:
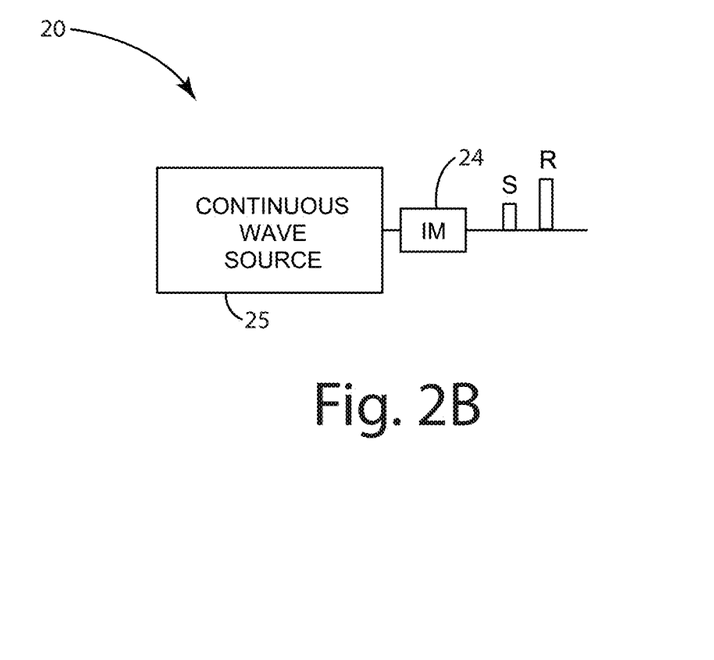
FIG. 2(B) illustrates the signal source in FIG. 2(A) as being a continuous wave signal source.
Figure 2C:
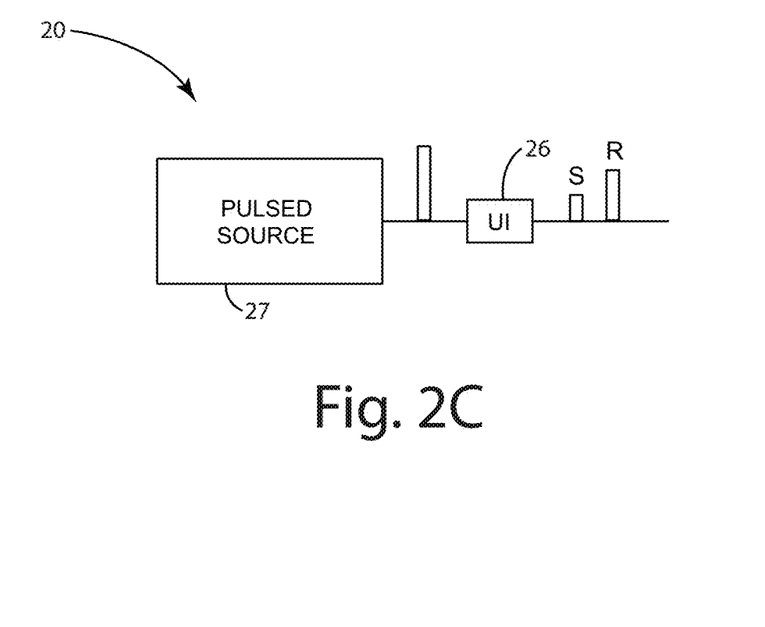
FIG. 2(C) illustrates the signal source in FIG. 2(A) as being a pulsed wave signal source.

Transmitting a signal pulse and a reference pulse is depicted as step 10 in FIG. 1. This step generally includes transmitting the optical signal through an optical path 22, e.g., a fiber optic channel or a free-space optical path, generally illustrated in FIG. 2(A), from a signal source 20, optionally a coherent light source. The optical signal includes a signal pulse and a reference pulse. As used herein, the term "signal pulse" (S) includes the pulsed output of a signal source having communication information embodied therein. For example, a signal pulse can have on the order of $10^0$ photons and its phase and/or amplitude may have been modulated by a modulator 24 to encode information (shown in FIG. 2(A) as an optical intensity modulator (IM) and an optical phase modulator (PM)). The term "reference pulse" (R) includes the pulsed output of a signal source having no information embodied therein. For example, a reference pulse can include on the order of $10^3$ photons having a constant phase relationship with a corresponding unmodulated signal pulse. That is, before encoding information, the unmodulated signal pulse and the reference pulse can be phase-correlated pulses. The signal pulse and the reference pulse can be generated by using and intensity modulation (IM) 24 to modulate the output of a continuous wave (CW) source 25 as shown in FIG. 2(B), or by splitting a single pulse from a pulsed source 27 using an unbalanced interferometer (UI) 26 as shown in FIG. 2(C).

Measuring the quadrature values of the signal pulse and the reference pulse is depicted as step 12 in FIG. 1. This step generally includes measuring, using an optical receiver, the in-phase quadrature (I) and the out-of-phase quadrature (Q) of the reference pulse R and the signal pulse S. Measuring the quadratures of the signal pulse and the reference pulse can be performed using a local oscillator source 30 and a 90-degree optical hybrid 32 as shown in FIG. 2(A). The optical hybrid 32 mixes each incoming pulse with a corresponding local oscillator generated by the local oscillator source 30. As used herein, a "local oscillator" is a pulsed output of a local oscillator source. The optical hybrid 32 outputs four light signals to two pairs of balanced photodetectors 34, 36, the output of which can be transmitted to a signal processor 38. For example, the optical hybrid 32 can mix the signal pulse S with a first local oscillator $LO_S$ and can mix the reference pulse R with a second local oscillator $LO_R$. The magnitude of the first local oscillator $LO_S$ is generally greater than the magnitude of the second local oscillator $LO_R$. The resulting output is then received by the signal processor 38. At the signal processor 38, both the amplitude of the input signal and the relative phase information between the input signal and the local oscillator can be extracted via digital signal processing. The optical receiver 32 can optionally include a 90-degree optical hybrid from Optoplex Corporation, which can also be used for coherent signal demodulation for either homodyne detection or heterodyne detection.

The signal pulse and the reference pulse can be transmitted in dissimilar modes. In the illustrated embodiment, the signal pulse and the reference pulse are transmitted in different temporal modes, in which a time delay Δt exists between the signal pulse and the reference pulse. In other embodiments, the dissimilar modes can include different spatial modes or different polarization modes, for example. The first local oscillator $LO_S$ and the second local oscillator $LO_R$ are also generated with dissimilar modes. In the illustrated embodiment, the first local oscillator $LO_S$ and the second local oscillator $LO_R$ include different temporal modes, in which the same time delay Δt exists between the first local oscillator $LO_S$ and the second local oscillator $LO_R$. In other embodiments, the modal difference for the local oscillators $LO_S$ and $LO_R$ includes different spatial modes or different polarization modes, for example.

Determining the phase difference between the signal source and the local oscillator source is depicted as step 14 in FIG. 1. This step is performed by the signal processor 38 in digital signal processing in the current embodiment. This step generally includes determining, for each transmission, the phase difference based on the measured quadratures of the phase reference pulse. The phase difference can be determined according to equation (1) below, in which $I_R$ represents the in-phase quadrature of the reference pulse and $Q_R$ represents the out-of-phase quadrature of the reference pulse:

$$\tan\varphi_R = \frac{Q_R}{I_R} \tag{1}$$

The uncorrected or raw phase for the signal pulse can be determined according to equation (2) below, in which $I_S$ represents the in-phase quadrature of the signal and $Q_S$ represents the out-of-phase quadrature of the signal:

$$\tan\varphi_{S,i}^{(raw)} = \frac{Q_S}{I_S} \tag{2}$$

Figure 3:
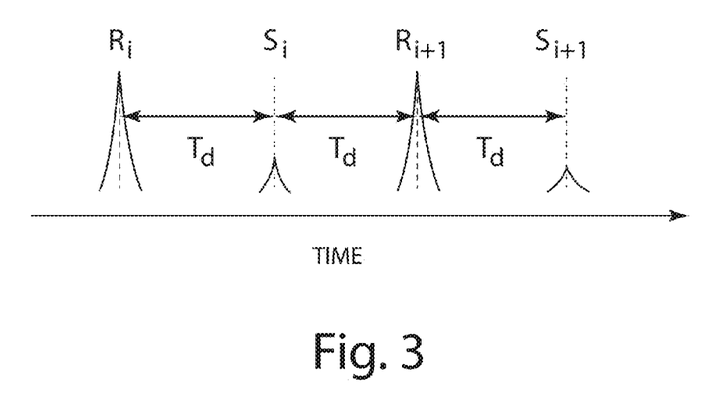
FIG. 3 illustrates the distribution of signal pulses and reference pulses from a signal source.

As shown in FIG. 3, the reference pulse R and the signal pulse S are measured at different times with the time delay of $T_d$. If the frequency difference of the two light sources $(f_1-f_2)$ is constant, the phase correction term of the signal pulse S can be determined by adding a constant phase shift of $2\pi \cdot (f_1-f_2) \cdot T_d$ to the phase measurement result $\varphi_R$ of the reference pulse R. However, in practice both light sources present slow frequency drift over time. The phase correction term for the signal pulse can be estimated using equation (3) below, in which $S_i$ is measured between two reference pulses $R_i$ and $R_{i+1}$:

$$\bar{\varphi}_{S,i} = \frac{\varphi_{R,i} + \varphi_{R,i+1}}{2} \tag{3}$$

The corrected phase for each signal pulse S is determined according to the following equation (4), in which the raw measured phase is corrected by the phase correction term in equation (3):

$$\phi_{S,i}^{(cor)} = \phi_{S,i}^{(raw)} + \bar{\phi}_{S,i} \tag{4}$$

To achieve an improved estimation of the phase ϕ, a brighter reference pulse R can be employed (for example, with 1000 photons per pulse). The intensity of the corresponding local oscillator $LO_R$ can be scaled down to avoid saturation of the coherent receiver.

The step of recovering the encoded information is depicted as step 16 in FIG. 1. This step is also performed by the signal processor 38 in digital signal processing in the current embodiment. This step generally includes determining, for each signal pulse S, the encoded quadrature information based on the determined phase difference between the signal source and the local oscillator source. For each pulse received, the encoded quadrature information ($I_0$ and $Q_0$) is calculated from the measured quadrature values ($I_S$ and $Q_S$) according to the following equations (5) and (6), in which $I_S$ represents the in-phase quadrature, $Q_S$ represents the out-of-phase quadrature, and $\bar{\phi}_{S,i}$ is the phase correction term given by equation (3)

$$I_0 = I_S \cos\bar{\phi}_{S,i} - Q_S \sin\bar{\phi}_{S,i} \tag{5}$$

$$Q_0 = I_S \sin\bar{\phi}_{S,i} + Q_S \cos\bar{\phi}_{S,i} \tag{6}$$

In the foregoing embodiment, the signal processor 38 of FIG. 2(A) outputs information recovered from the signal pulse(s), optionally for use in classical coherent communication protocols and quantum communication protocols. The signal processor 38 is generally programmed with a series of instructions that, when executed, cause the processor to perform method steps 14 and 16 as described above. The instructions that are performed by the signal processor are generally stored in a computer readable data storage device. The computer readable data storage device can be a portable memory device that is readable by the signal processor. Such portable memory devices can include a compact disk, a digital video disk, a flash drive, and any other disk readable by a disk driver embedded or externally connected to a computer, a memory stick, or any other portable storage medium whether now known or hereinafter developed. Alternatively, the computer readable data storage device can be an embedded component of a computer such as a hard disk or a flash drive of a computer. Together, the signal processor and computer readable data storage device can be a standalone device or embedded into a machine or a system that uses the instructions for a useful result.

To reiterate, the method and system of the present invention include a strong local oscillator source at the receiver operating in a free running mode independent of the signal source. The phase relation between the signal source and the local oscillator source is determined based on quadrature measurements on pilot pulses from the signal source, namely the reference pulse R. Using the above phase relation, information encoded in an incoming signal S can be recovered, optionally for use in communication with classical coherent communication protocols and quantum communication protocols. It should be noted that sending the reference pulse R will not create problems as is the case when sending a strong local oscillator through the communication channel. First, the reference pulse R is only used to estimate the phase difference between the transmitter laser and the local oscillator laser, and it will not be used as a local oscillator in coherent detection, and consequently this scheme will not create loopholes in quantum communication. Second, the intensity of the reference pulse (on the order of $10^3$ photons) is much lower than that of the local oscillator (on the order of $10^8$ photons). The noise generated by the reference pulse R in the communication channel is practically negligible.

The following publication is incorporated by reference in its entirety: *Generating the Local Oscillator "Locally" in Continuous-Variable Quantum Key Distribution Based on Coherent Detection* by Qi et al (2015) (available at http://arXiv:1503.00662). The following non-limiting examples are discussed in the foregoing publication, and are summarized below.

Example 1

Figure 4:
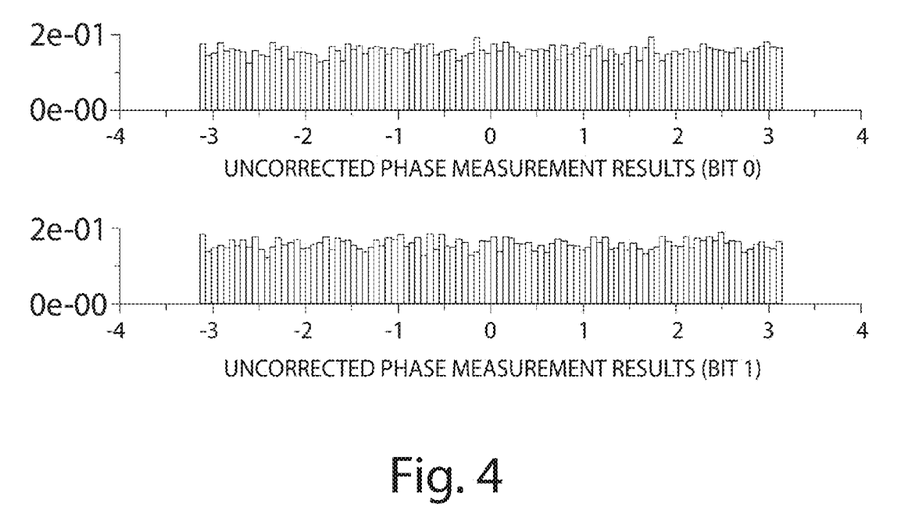
FIG. 4 includes histograms of measurement results corresponding to bit 0 before phase correction and bit 1 before phase correction in accordance with a first example.
Figure 5:
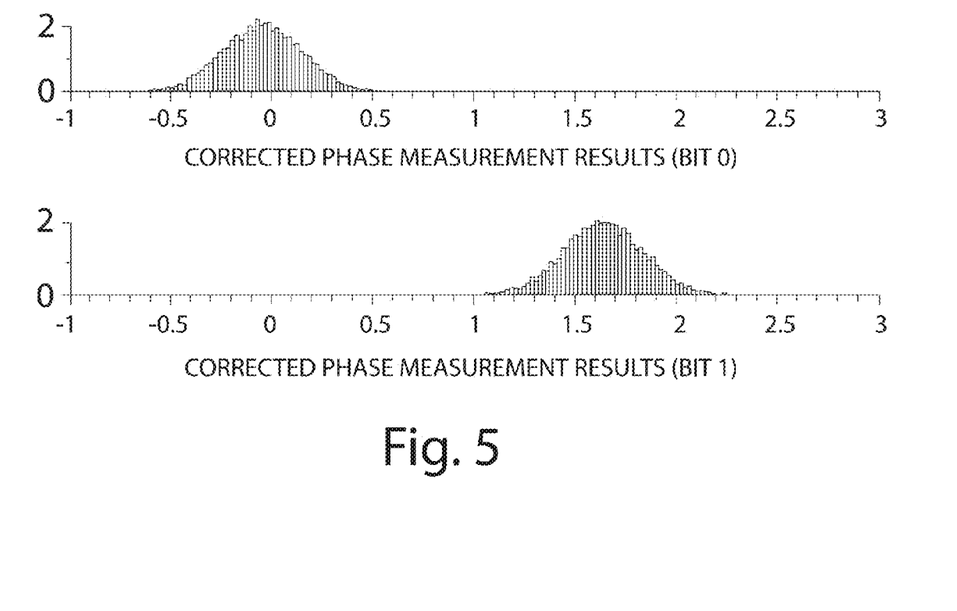
FIG. 5 includes histograms of measurement results corresponding to bit 0 after phase correction and bit 1 after phase correction in accordance with a first example.

A pilot-aided feedforward data recovery scheme was implemented in the following example, described in connection with FIGS. 4-5, which is intended to be non-limiting.

Two commercial frequency-stabilized continuous wave lasers (Clarity-NLL-1542-HP from Wavelength Reference) were employed as the signal laser and as the LO laser. Both lasers were operated in a free-running mode with no optical or electrical connections between them. A $LiNbO_3$ waveguide intensity modulator by EOSpace was used to generate 8 ns laser pulses at a repetition rate of 50 MHz. Half of the laser pulses were used as phase reference pulses, resulting in an equivalent data transmission rate of 25 MHz. A $LiNbO_3$ waveguide phase modulator was used to modulate the phase of the signal pulses.

The signal pulses and the reference pulses were transmitted through a spool of 25 km single mode fiber before arriving at the measurement device. A commercial 90° optical hybrid (Optoplex) and two 350 MHz balanced amplified photodetectors (Thorlabs) measured the in-phase quadrature and the out-of-phase quadrature of the incoming pulses. The output of the two balanced photodetectors was sampled by a broadband oscilloscope at 1 GHz sampling rate. The LO laser was operated in a continuous wave mode. A waveform generator with a bandwith of 120 MHz provided the modulation signals to both the intensity and the phase modulator, and a synchronization signal to the oscilloscope.

To evaluate the performance of the phase recovery scheme, the phase modulator encoded binary phase information on the signal pulse using a binary pattern of "01010101 . . . " where bit 0 was represented by no phase shift and bit 1 was represented by a phase shift of 1.65 rad. The amplitude of the signal pulse was the same as that of the reference pulse. At the receiver, the average photon number per pulse was about $10^5$. In total, 25000 signal pulses and 25000 reference pulses were transmitted. For each pulse received, the signal phase $\phi_{S,i}^{(raw)}$ and the reference phase $\phi_{R,i}$ were calculated from the measured quadrature values using equations (1) and (2) above. The phase measurement results from the signal pulses are shown in FIG. 4. Due to the random phase change between the signal laser and the LO laser, the measured phases are randomly distributed within $[0, 2\pi)$, regardless of the encoded phase information. From the phase measurements results of the reference pulses, the phase reference $\bar{\phi}_{S,i}$ was determined according to equation (3). Using the phase reference $\bar{\phi}_{S,i}$, the corrected phase information was determined using equation (4). The corrected phase measurement results are shown in FIG. 5. After the phase correction, the measurement results for bit 0 and bit 1 are clearly separated. In addition, the variance in the phase noise (the difference between $\phi_{S,i}^{(cor)}$ and the phase information encoded by the sender) was determined to be 0.040±0.001 for bit 0 and 0.039±0.001 for bit 1.

Example 2

The following non-limiting example includes the remapping of quadrature values of weak quantum signals using the phase reference recovered from the reference pulses.

Figure 6:
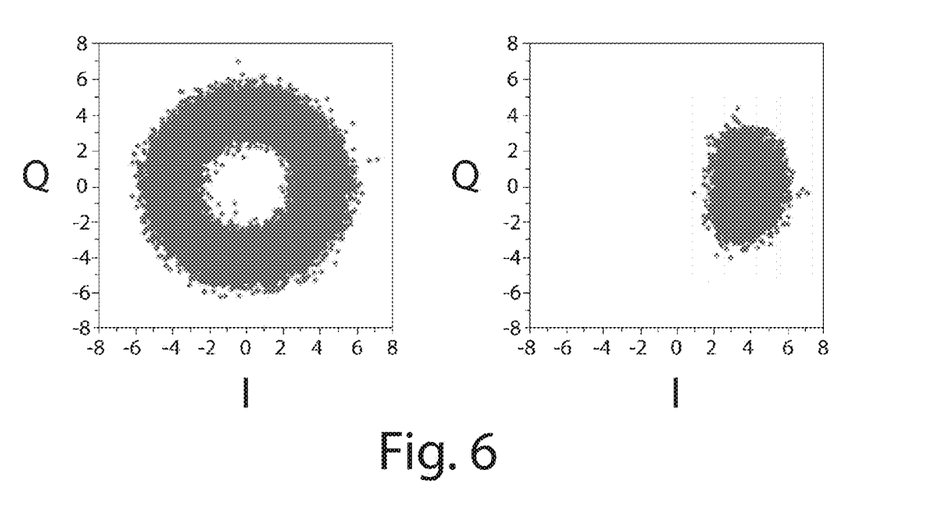
FIG. 6 includes measured quadrature values in phase space in accordance with a second example.

Using the apparatus of the foregoing example, non-modulated signal pulses and corresponding reference pulses were received at a commercial 90° optical hybrid (Optoplex). The average photon number of each reference pulse at the receiver's end was about 1000, and the average photon number of each signal pulse was 66. FIG. 6 illustrates the quadrature values (Q, I) of the signal pulses in phase-space (sample size was 24000). FIG. 6 at left shows the raw measurement results, where the phase is randomly distributed in $[0, 2\pi)$ as expected. FIG. 6 at right shows the results after performing quadrature remapping. Using equation (3) above, the phase reference $\bar{\phi}_{S,i}$ was determined for each signal pulse. The raw quadrature values of the signal pulses were then rotated according to equations (5) and (6). The quadrature values were also scaled by taking into account the 3-dB loss due to heterodyne detection and the 50% overall efficiency of the detection system. The noise variance in the I-quadrature (FIG. 6 at right) was determined to be 1.83 in shot noise units.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:
1. A method for pilot-aided feedforward data recovery comprising:
transmitting, from a signal light source, an optical signal including a signal pulse and a reference pulse, the signal pulse carrying information encoded therein;

detecting the optical signal at an optical coherent receiver, the signal light source and the optical coherent receiver being coupled through an optical channel;

measuring the quadrature values of the signal pulse and the reference pulse using a first local oscillator and a second local oscillator, respectively, generated from a common local oscillator source, wherein measuring the quadrature values includes mixing the signal pulse with the first local oscillator and mixing the reference pulse with the second local oscillator and is performed with a 90-degree optical hybrid that provides an output to balanced photodetectors;

determining the phase difference between the signal light source and the local oscillator source based on the measured quadrature values of the reference pulse; and recovering the information ($I_O$, $Q_O$) from the measured quadrature values ($I_S$, $Q_S$) of the signal pulse using the determined phase difference between the signal light source and the local oscillator source and the following equations, in which $\overline{\phi}_{S,i}$ is a phase correction term that is a function of the phase difference between the signal light source and the local oscillator source:

$$I_O = I_S \cos \overline{\phi}_{S,i} - Q_S \sin \overline{\phi}_{S,i}$$

$$Q_O = I_S \sin \overline{\phi}_{S,i} + Q_s \cos \overline{\phi}_{S,i}.$$

2. The method according to claim 1 wherein determining the phase difference between the signal light source and the local oscillator source includes determining the phase of the reference pulse.

3. The method according to claim 2 wherein determining the phase of the reference pulse includes performing an inverse tangent of the quotient of the in-phase quadrature of the reference pulse over the out-of-phase quadrature of the reference pulse.

4. The method according to claim 1 further including operating the signal light source and the local oscillator source in a free-running mode.

5. The method according to claim 1 further including distributing at least a portion of the encoded information as a cryptographic key.

6. The method according to claim 1 wherein the optical signal includes a plurality of signal pulses and a corresponding plurality of reference pulses.

7. The method according to claim 1 wherein the optical signal includes a plurality of signal pulses and a single reference pulse.

8. An optical receiver for coherent light detection comprising:
an input to receive an optical signal from a signal light source, the optical signal including a signal pulse and a reference pulse, the signal pulse and the reference pulse including dissimilar temporal modes, dissimilar spatial modes, or dissimilar polarization modes, each of the signal pulse and the reference pulse having quadrature values;

a local oscillator source including a light source for providing first and second local oscillators in dissimilar modes corresponding to that of the signal pulse and the reference pulse;

an optical quadrature hybrid that is adapted to:
measure the quadrature values of the signal pulse using the first local oscillator by mixing the signal pulse with the first local oscillator and providing a first output to first and second balanced photodetectors, and measure the quadrature values of the reference pulse using the second local oscillator by mixing the reference pulse with the second local oscillator and providing a second output to the first and second balanced photodetectors; and a signal processor electrically coupled to the first and second balanced photodetectors, the signal processor being programmed with a series of instructions stored to non-transient memory that, when executed, cause the signal processor to:
determine a phase difference between the signal light source and the local oscillator light source, the phase difference being based on the measured quadrature values of the reference pulse, recover information ($I_O$, $Q_O$) in the signal pulse based on the determined phase difference and based on the measured quadrature values ($I_S$, $Q_S$) of the signal pulse using the following equations, in which $\overline{\phi}_{S,i}$ is a phase correction term that is a function of the determined phase difference:

$$I_O = I_S \cos \overline{\phi}_{S,i} - Q_S \sin \overline{\phi}_{S,i}$$

$$Q_O = I_S \sin \overline{\phi}_{S,i} + Q_s \cos \overline{\phi}_{S,i}, \text{ and}$$

output the information for a communication system different from the optical receiver.

9. The optical receiver of claim 8 wherein the optical quadrature hybrid performs heterodyne detection on the signal pulse and the reference pulse.

10. The optical receiver of claim 8 wherein the optical quadrature hybrid performs homodyne detection on the signal pulse and the reference pulse.

11. The optical receiver of claim 8 wherein determining the phase difference between the signal light source and the local oscillator source includes performing an inverse tangent of an in-phase quadrature of the reference pulse over an out-of-phase quadrature of the reference pulse.

12. The optical receiver of claim 8 wherein the local oscillator source operates in a free-running mode.

13. The optical receiver of claim 8 further including first and second balanced photodetectors coupled between the optical quadrature hybrid and the signal processor.

14. The optical receiver of claim 8 wherein the optical quadrature hybrid is a 90-degree optical hybrid.

15. A method for optical coherent detection comprising:
generating, using a signal light source, a signal including first and second pulses having a phase relationship and in different modes, wherein the first pulse carries information for quantum or classical communication and the second pulse provides a phase reference;

generating, using a local oscillator light source, first and second local oscillators in the different modes associated with the first and second pulses of the signal;

measuring the in-phase quadrature and the out-of-phase quadrature of the first pulse of the signal using the first local oscillator, wherein measuring the in-phase quadrature value and the out-of-phase quadrature value of the first pulse includes mixing the first pulse with the first local oscillator and is performed with a 90-degree optical hybrid that provides a first output to first and second balanced photodetectors;

measuring the in-phase quadrature and the out-of-phase quadrature of the second pulse of the signal using the second local oscillator, wherein measuring the in-phase quadrature value and the out-of-phase quadrature value of the second pulse includes mixing the second pulse with the second local oscillator and is performed with the 90-degree optical hybrid;

determining the phase difference between the signal light source and the local oscillator source based on the in-phase quadrature and the out-of-phase quadrature of the second pulse of the signal; and recovering the carried information ($I_O$, $Q_O$) based on the determined phase difference, the measured in-phase quadrature and the out-of-phase quadrature of the first phase of the signal ($I_S$, $Q_S$), and the following equations, in which $\overline{\phi}_{S,i}$ is a phase correction term that is a function of the phase difference between the signal light source and the local oscillator source:

$I_O = I_S \cos \overline{\phi}_{S,i} - Q_S \sin \overline{\phi}_{S,i}$ $Q_O = I_S \sin \overline{\phi}_{S,i} + Q_s \cos \overline{\phi}_{S,i}$.

16. The method according to claim 15 wherein determining the phase difference between the signal light source and the local oscillator source includes determining the phase of the reference pulse.

17. The method according to claim 16 wherein determining the phase of the reference pulse includes performing an inverse tangent of the quotient of the in-phase quadrature of the reference pulse over the out-of-phase quadrature of the reference pulse.

18. The method according to claim 15 further including operating the signal light source and the local oscillator source in a free-running mode.

19. The method according to claim 15 further including distributing at least a portion of the carried information as a cryptographic key.

20. The method according to claim 15 wherein the optical signal includes a plurality of signal pulses and a corresponding plurality of reference pulses.

* * * * *